(12) United States Patent
Sokolov et al.

(10) Patent No.: US 6,754,796 B2
(45) Date of Patent: Jun. 22, 2004

(54) FRAMEWORKS FOR IMPLEMENTATION OF JAVA HEAPS

(75) Inventors: Stepan Sokolov, Fremont, CA (US); David Wallman, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/919,751

(22) Filed: Jul. 31, 2001

(65) Prior Publication Data

US 2003/0028741 A1 Feb. 6, 2003

(51) Int. Cl.[7] .............................................. G06F 12/00
(52) U.S. Cl. ...................... 711/171; 711/170; 711/172; 711/173; 709/316; 709/322; 717/162
(58) Field of Search ................................ 711/170, 171, 711/172, 173; 709/316, 332; 717/162

(56) References Cited

U.S. PATENT DOCUMENTS

| | | | | | |
|---|---|---|---|---|---|
| 6,018,793 | A | * | 1/2000 | Rao | 711/150 |
| 6,286,016 | B1 | * | 9/2001 | Heller et al. | 707/206 |
| 6,295,594 | B1 | * | 9/2001 | Meier | 711/171 |
| 6,421,739 | B1 | * | 7/2002 | Holiday | 709/330 |
| 6,421,761 | B1 | * | 7/2002 | Arimilli et al. | 711/128 |
| 6,453,403 | B1 | * | 9/2002 | Czajkowski | 711/170 |
| 6,526,422 | B1 | * | 2/2003 | Flood et al. | 707/206 |

OTHER PUBLICATIONS

Microquill:Smartheap Technical Specification, Internet Document, Online! Sep. 19, 2000, http://web.archive.org/web/20000919050512/www.microquill.com/prod_sh/sh_tspec.htm.

Shuf et al., "Disinguishing Between Prolific and Non–Prolific Types for Efficient Memory Management," IBM Research Report, Apr. 5, 2001.

Vo, "Vmalloc: A General and Efficient Memory Allocator," Software Practice and Experience, vol. 26(3), 357–374, Mar. 1996.

Hanson, "Fast Allocation and Deallocation of Memory Based on Object Lifeimes," Software Practice and Experience, vol. 20(1), 5–12, Jan. 1990.

Nilsen, "Garbage Collection of Strings and Linked Data Structures in Real Time," Software Practice and Experience, vol. 18(7), 613–640, Jul. 1988.

Cohen, "Garbage Collection of Linked Data Structures," Computing Surveys, vol. 13, No. 3, Sep. 1981.

Bozman et al., "Analysis of Free–Storage Algorithms–Revisited," IBM Systems Journal, vol. 23, No. 1, 1984.

Lindholm et al., "The Java™ Virtual Machine Specification," (Sep., 1996), Sun Microsystems, Inc., Chapters 1–10 (173 pages).

* cited by examiner

*Primary Examiner*—Donald Sparks
*Assistant Examiner*—Ngoc Dinh
(74) *Attorney, Agent, or Firm*—Beyer Weaver & Thomas, LLP

(57) ABSTRACT

Techniques for implementation of Java heaps are disclosed. The techniques can be implemented in a Java virtual machine operating in a Java computing environment. A Java heap potion comprising two or more designated portions is disclosed. Each of the designated heap portions can be designated to store only a particular Java logical component (e.g., Java objects, Java class representation, native components, etc.) A designated heap portion can be implemented as a memory pool. In other words, two or more designated heap portions can collectively represent a memory pool designated for a particular Java logical component. The memory pools allow for dynamic management of the designated heap portions. As a result, the performance of the virtual machines, especially those operating with relatively limited resources is improved.

23 Claims, 5 Drawing Sheets

FRAMEWORKS FOR IMPLEMENTATION OF JAVA HEAPS

BACKGROUND OF THE INVENTION

The present invention relates generally to Java programming environments, and more particularly, to techniques suitable for implementation of Java heaps.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet that allows communication between diverse computer platforms through a graphical interface. Computers communicating over the Web are able to download and execute small applications called applets. Given that applets may be executed on a diverse assortment of computer platforms, the applets are typically executed by a Java™ virtual machine.

Recently, Java programming environment has become quite popular. Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference.

FIG. 1A shows a progression of a simple piece of a Java source code 101 through execution by an interpreter, the Java virtual machine. The Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java class file 105 that includes the Bytecodes for the Java program. The Java class file is input into a Java virtual machine 107. The Java virtual machine is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The methods portion 108 can include or have references to several Java methods associated with the Java class which is represented in the class file 100.

Conventionally, various components of the Java computing environment are stored in a Java heap. These components include Java class representations and Java objects, as well as other logical components of the Java computing environment (e.g., native language components). One problem with conventional implementation of Java heaps if that various components can be intermixed together in the Java heap. As a result, a significant amount of processing has to be performed to access various components in the Java heap, maintain the Java heap, and so forth. This, of course, can result in a grossly inefficient use of system resources. In some circumstances, particularly in systems with limited computing power and/or memory, this inefficient use of resources is a serious disadvantage.

In addition, it is highly desirable to dynamically manage Java heaps (e.g., expand the heap in case more memory is needed). This is particularly useful in systems with relatively limited resources, partly because large amounts of memory cannot be reserved regardless of whether the allocated memory will be used or not. Accordingly, improved techniques for implementation of Java heaps are needed.

SUMMARY OF THE INVENTION

Broadly speaking, the invention relates to techniques for implementation of Java heaps. As such, the invention can be implemented in a Java virtual machine operating in a Java computing environment. In accordance with one aspect of the invention, a Java heap potion comprising two or more designated portions is disclosed. Each of the designated heap portions can be designated to store only a particular Java logical component (e.g., Java objects, Java class representation, native components, etc.) As will be appreciated, a designated heap portion can be implemented as a memory pool. In other words, two or more designated heap portions can collectively represent a memory pool designated for a particular Java logical component. The memory pools allow for dynamic management of the designated heap portions. As a result, the performance of the virtual machines, especially those operating with relatively limited resources is improved.

The invention can be implemented in numerous ways, including as a method, an apparatus, a computer readable medium, and a database system. Several embodiments of the invention are discussed below.

As a Java computing environment including a Java heap memory, the Java heap memory includes two or more designated portions, wherein each of the designated portions are designated for storing a logical component of the Java computing environment, and wherein each of the designated portions stores only the logical component that is designated to it.

As a Java virtual machine operating in a Java computing environment including a Java heap memory, one embodiment of the invention describes two or more designated portions, wherein each of the designated portions are designated for storing a logical component of the Java computing environment, and wherein each of the designated portions stores only the logical component that is designated to it.

As a computer readable media for storing a Java heap memory, one embodiment of the invention includes two or more designated portions, wherein each of the designated portions are designated for storing a logical component of the Java computing environment, and wherein each of the designated portions stores only the logical component that is designated to it.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to improve performance in Java compliant virtual machines.

To achieve this and other objects of the invention, techniques for implementation of Java heaps are disclosed. As such, the techniques can be implemented in a Java virtual machine operating in a Java computing environment. In accordance with one aspect of the invention, a Java heap potion comprising two or more designated portions is disclosed. Each of the designated heap portions can be designated to store only a particular Java logical component (e.g., Java objects, Java class representation, native components, etc.) As will be appreciated, a designated heap portion can be implemented as a memory pool. In other words, two or more designated heap portions can collectively represent a memory pool designated for a particular Java logical component. The memory pools allow for dynamic management of the designated heap portions. As a result, the performance of the virtual machine, especially those operating with relatively limited resources is improved.

Embodiments of the invention are discussed below with reference to FIGS. 2A–3C. However, those skilled in the art will readily appreciate that the detailed description given herein with respect to these figures is for explanatory purposes only as the invention extends beyond these limited embodiments.

Figure 1A:
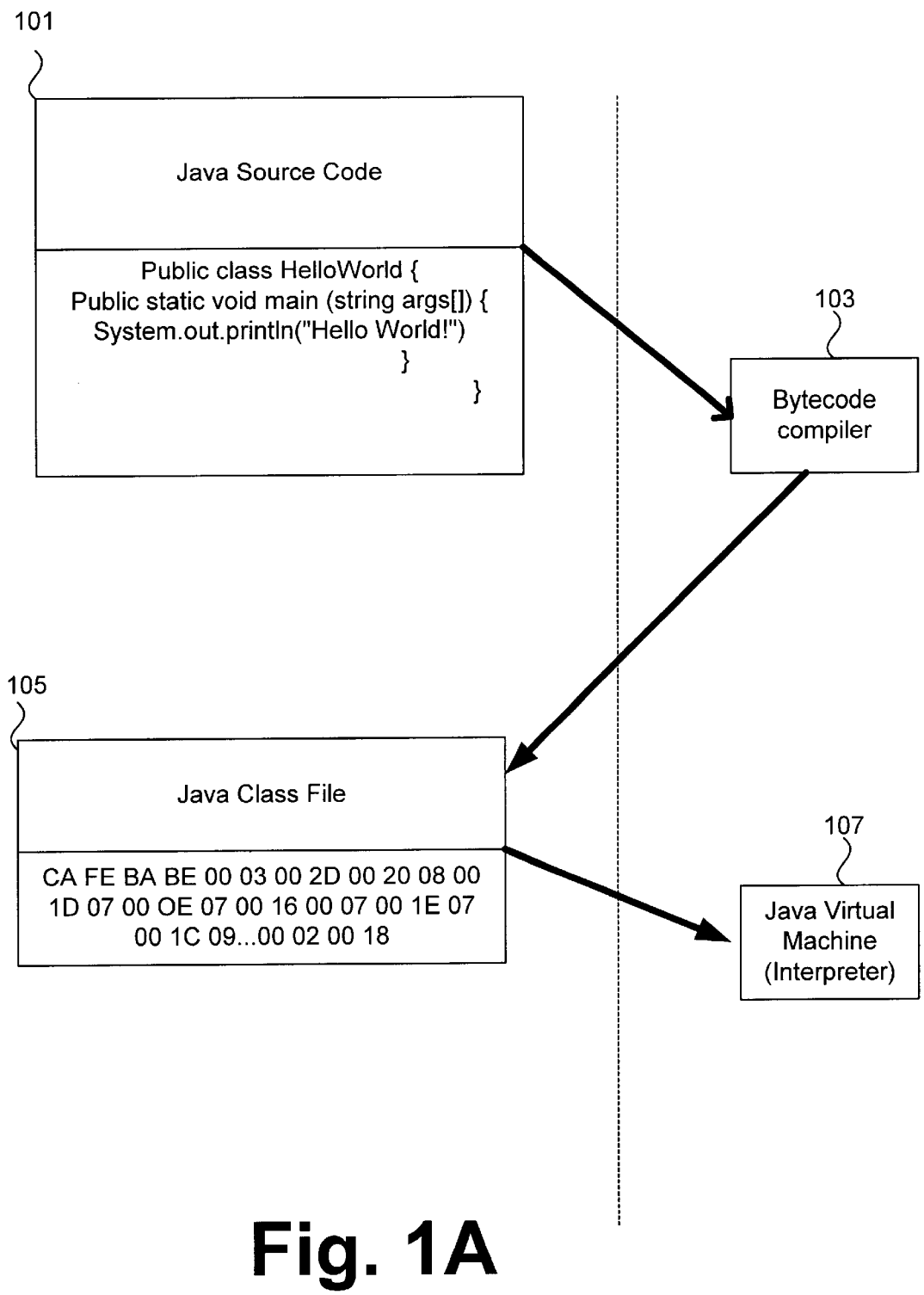
FIG. 1A shows a progression of a simple piece of a Java source code through execution by an interpreter, the Java virtual machine.
Figure 1B:
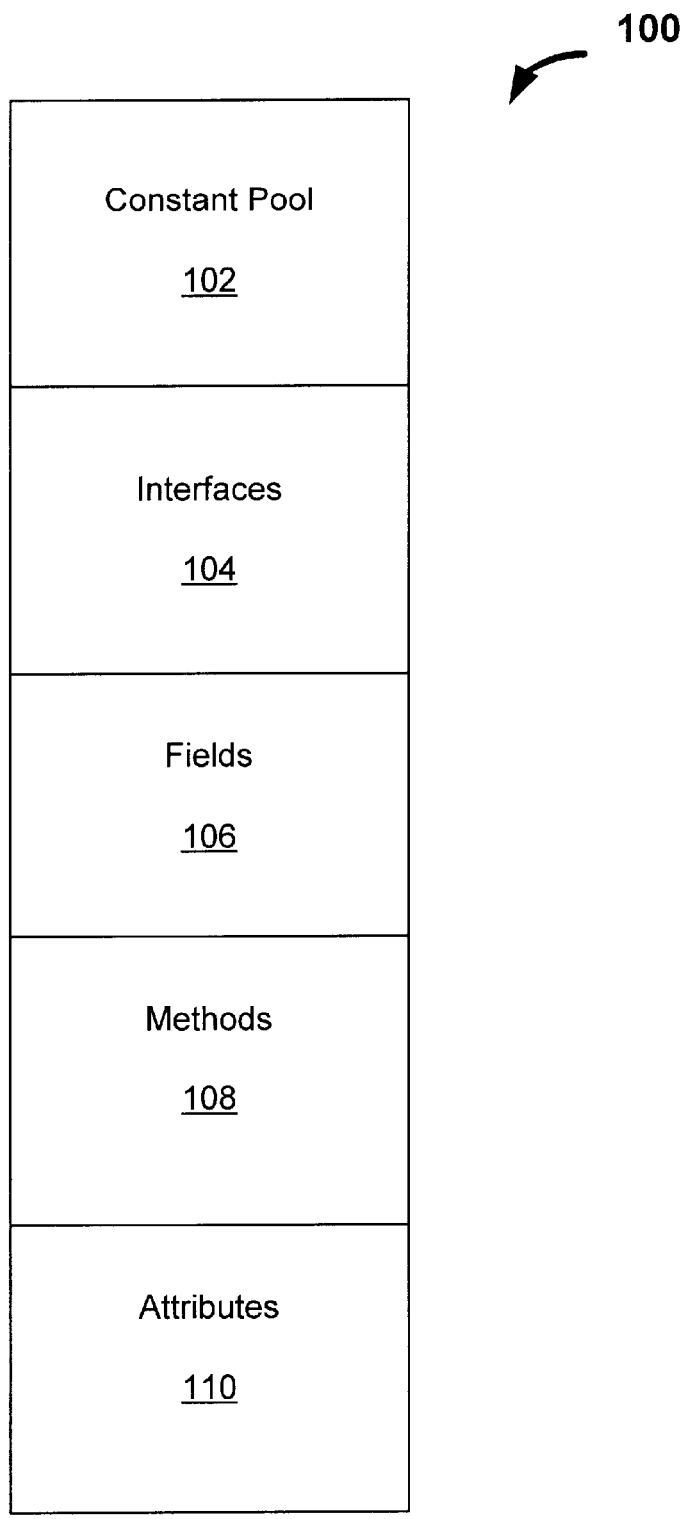
FIG. 1B illustrates a simplified class file.
Figure 2A:
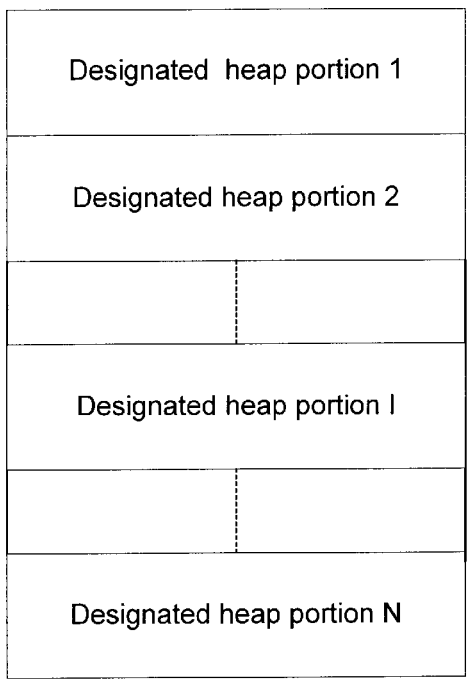
FIGS. 2A–3C illustrate a Java heap in accordance with one aspect of the invention.

FIG. 2A illustrates a Java heap 200 in accordance with one embodiment of the invention. The Java heap 200 can be implemented in a Java computing environment (e.g., in a Java virtual machine). As shown in FIG. 2A, the Java heap 200 can include two or more designated heap portions (designated heap portions 1-N). As will be appreciated, each of the designated heap portions 1-N are suitable for storing a logical component of said Java computing environment. These logical components can, for example, be Java class representations, Java objects, native components, etc.

Figure 2B:
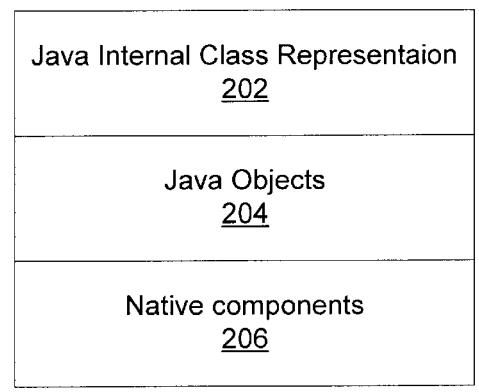

Accordingly, a particular Java heap portion can be designated for storing only a particular logical component. By way of example, FIG. 2B illustrates a Java heap portion 201 in accordance with one embodiment of the invention. The Java heap portion 201 includes a Java internal class representation portion 202, a Java objects portion 204, and a native component portion 206. In the described embodiment, each of the heap portions 202, 204, and 206 are designated for storing only a particular Java logical component. As such, the Java internal class representation portion 202, Java objects portion 204, and native component portion 206 are respectively designated to store Java internal class representations, Java objects, and native components.

As will be appreciated, the organization of Java heap portion 201 allows for much more efficient access to various logical components of the Java computing environment. As a result, the performance of virtual machines, especially those operating with limited resources, can be enhanced. It should also be appreciated that the invention allows designation of heap portions for virtually any desired purpose (e.g., a heap portion may be designated for a particular object, a particular class, etc.). This allows a great deal of flexibility which can be used to further enhance the performance of Java virtual machines.

Figures 3A, 3B:
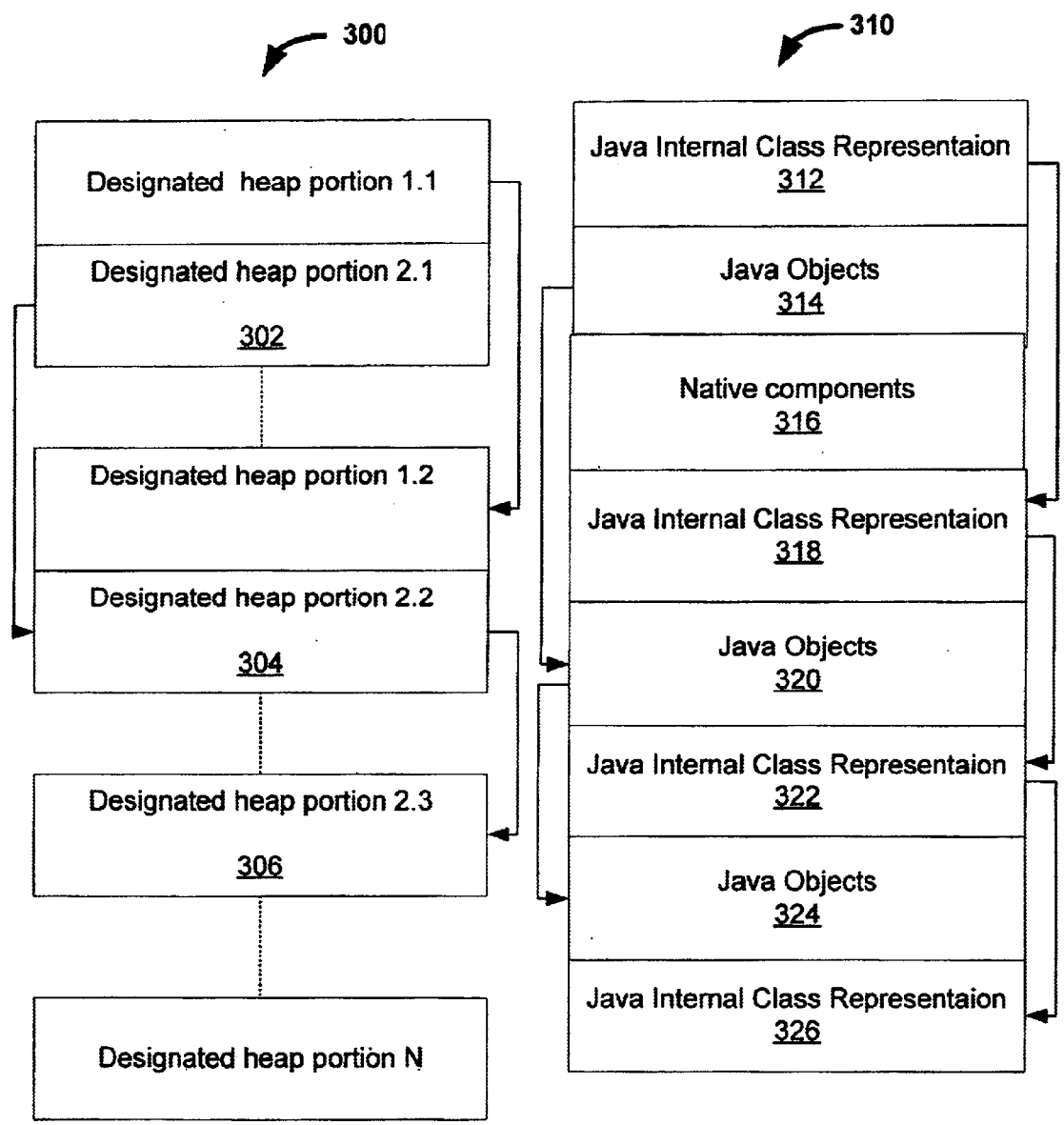

As noted in the background, it is highly desirable to have the ability to dynamically manage Java heaps (e.g., expand the heap in case more memory is needed). However, in systems with relatively limited resources, large amounts of memory cannot be reserved for the heap regardless of whether the allocated memory will be used or not. To achieve this and other objectives of the invention, the designated heap portion can be implemented as memory pool list. FIG. 3A illustrates a Java heap 300 in accordance with one embodiment of the invention. As shown in FIG. 3A, the Java heap 300 includes several designated heap portions. Again, each of these designated heap portions can be designated to store only a particular Java logical element. Moreover, two or more designated heap portions can collectively represent a memory pool. As such, each memory pool can include two or more address spaces which are linked together (e.g., as a linked list). For example, the designated heap portions 302, 304 and 306 together represent a non-continuous address space which has been linked as a memory pool. Accordingly, the designated heap portions 302, 304 and 306 can be used to store a particular Java logical element.

FIG. 3B illustrates a Java heap 310 in accordance with one embodiment of the invention. The Java heap 310 is suitable for storing Java internal class representations, Java objects and native components. As such, one or more heap portions are designated for storing each of these Java logical components. For example, the designated heap portions 312, 318 and 322 have all been designated to store only Java internal class representations.

Figure 3C:
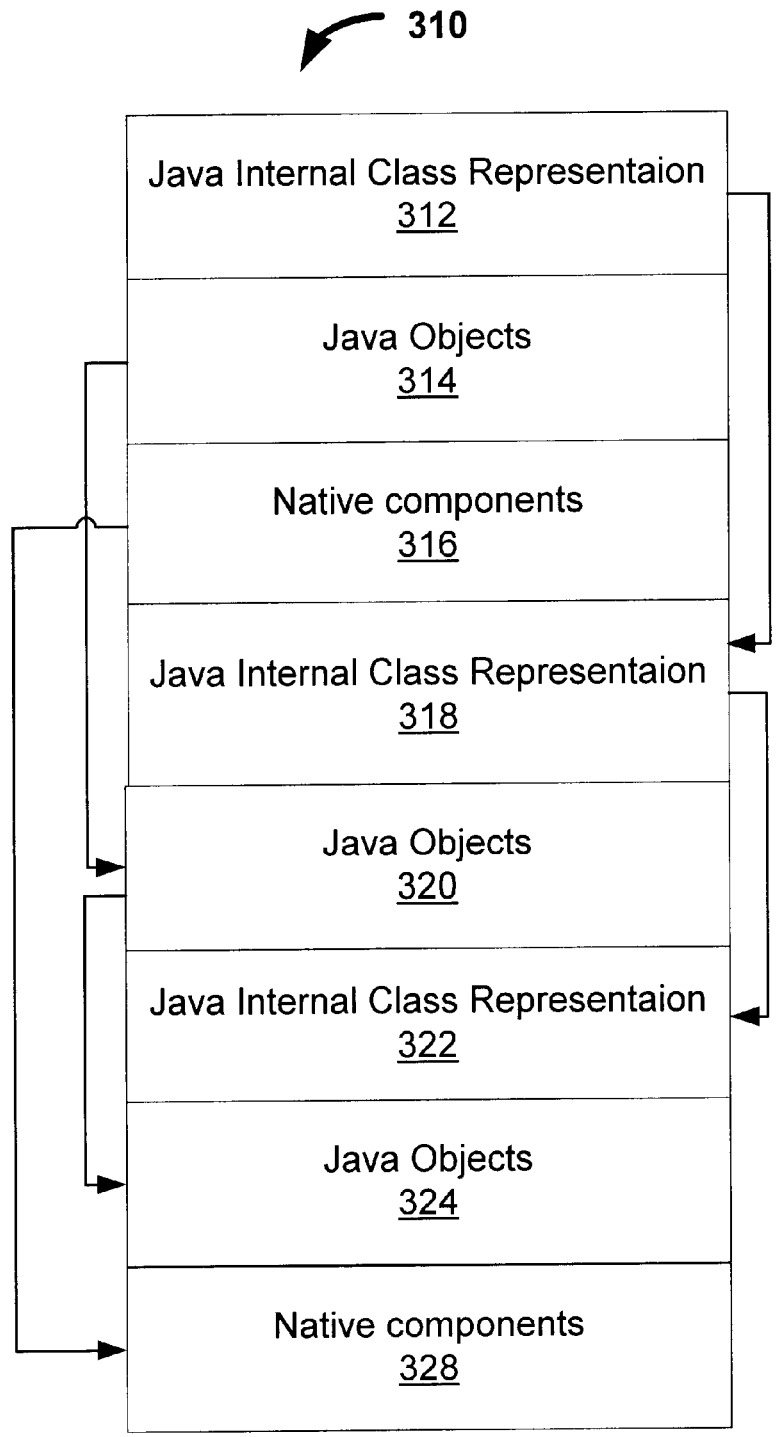

As will be appreciated, memory pools can be managed dynamically to allow adding and removing of the designated heap portions. To illustrate, FIG. 3C depicts the Java heap 310 shown in FIG. 3B after a designated heap portion has been removed and a new designated heap portion has been added. It should be noted that the Java heap portion 326 (shown in FIG. 3B) is designated for storage of Java internal class representations has been removed. Instead, a new Java heap portion 326 designated for storage of native components has been added. As shown in FIG. 3C, the new Java heap portion 326 can be linked with the Java heap portion 328 which is also designated for storage of native components. Accordingly, heap memory can dynamically be managed for various Java logical components. This means that memory can be efficiently used. As a result, performance of virtual machines, especially those operating with limited resources, can be enhanced.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In a Java computing environment a Java heap, said Java heap comprising:

two or more designated portions, wherein each of said designated portions are designated for storing a logical component of said Java computing environment, wherein each of said designated portions has been designated to store only one logical component, and wherein each of said designated portions stores only one logical component of said Java computing environment, and wherein at least one of said two or more designated portions is implemented in a non-continuous memory address space.

2. A Java heap memory as recited in claim 1, wherein said at least one designated portion is implemented as a linked list of continuous address spaces.

3. A Java heap memory as recited in claim 2, wherein said at least one designated portion can grow dynamically during the execution of a Java program.

4. A Java heap memory as recited in claim 3, wherein said at least one designated portion can shrink dynamically during the execution of a Java program.

5. A Java heap memory as recited in claim 1, wherein said at least one designated portion can grow or shrink dynamically during the execution of a Java program.

6. A Java heap memory as recited in claim 1, said wherein logical components can be a Java object, a Java class representation, or a native component.

7. A Java heap memory as recited in claim 4, wherein another designated portion can be added to said heap portion during the execution of a Java program.

8. A Java virtual machine operating in a Java computing environment, said Java virtual machine comprising:

a Java heap memory, said Java heap memory including:
two or more designated portions, wherein each of said designated portions are designated for storing a logical component of said Java computing environment, wherein each of said designated portions stores only the logical component that is designated to it, and wherein at least one of said two or more designated portions is implemented in a non-continuous memory address space.

9. A Java virtual machine as recited in claim 8, wherein said at least one designated portion is implemented as a linked list of continuous address spaces.

10. A Java virtual machine as recited in claim 9, wherein said at least one designated portion can be managed dynamically during the execution of a Java program.

11. A Java virtual machine as recited in claim 10, wherein logical components can be a Java object, a Java class representation, or a native component.

12. A computer readable media for storing a Java heap memory, said Java heap memory comprising:

two or more designated portions, wherein each of said designated portions are designated for storing a logical component of said Java computing environment, wherein each of said designated portions stores only the logical component that is designated to it, and wherein at least one of said two or more designated portions is implemented in a non-continuous memory address space.

13. A computer readable media as recited in claim 12, wherein said at least one designated portion is implemented as a linked list of continuous address spaces.

14. A computer readable media as recited in claim 13, wherein said at least one designated portion can grow or shrink dynamically during the execution of a Java program.

15. A computer readable media as recited in claim 14, wherein said logical components can be a Java object, a Java class representation, or a native component.

16. In a Java computing environment, a Java heap for storing software components of said Java computing environment, said Java heap comprising:

two or more designated portions, wherein each of said designated portions are allocated and reserved for storing only one software component of said Java computing environment;

wherein each of said two or more designated portions are implemented in a non-continuous memory address space, and wherein each of said two or more designated portions store a software component of said Java computing environment, and wherein each of said designated portions store only one software component of said Java computing environment, and wherein each of said two or more designated portion can grow dynamically during the execution of a Java program.

17. A Java Heap as recited in claim 16, wherein the software component is a Java object, or a Java class representation, or a native component corresponding to a component written in a programming language other than Java.

18. A Java Heap as recited in claim 17, wherein said two or more designated portions can grow on shrink dynamically during the execution of a Java program.

19. A method for providing a Java heap memory that can be used as heap memory during the execution of Java program in a Java computing environment, said method comprising:

allocating memory to be used as Java heap memory;
designating two or more designated areas of said memory portion as Java heap portions, wherein at least one of said two or more designated Java heap portions is implemented in a non-continuous memory address space; and assigning a logical component of said Java computing environment to each of said two or more designated Java heap portions, wherein each of said designated heap portions is assigned to store only one logical component of said Java computing environment.

20. A method as recited in claim 19, wherein said at least one designated portion is implemented as a linked list of continuous address spaces.

21. A method as recited in claim 19, wherein said further comprises:

dynamically managing said two or more Java heap portions during the execution of said Java program.

22. A method as recited in claim 19, said wherein logical components can be a Java object, a Java class representation, or a native component.

23. A method as recited in claim 19, wherein said method comprises one or more of the following:

adding a new designated Java heap portion to said Java heap during the execution of said Java program; and removing a designated heap portion from said Java heap during the execution of said Java program.

* * * * *